US007376495B2

(12) United States Patent
Coggins et al.

(10) Patent No.: US 7,376,495 B2
(45) Date of Patent: May 20, 2008

(54) FUEL INFORMATION MESSAGING SYSTEM

(75) Inventors: Keith Coggins, Norcross, GA (US); Steven Jackson, Norcross, GA (US); Timothy Lee Archer, Suwanee, GA (US); John Eric Simmons, Covington, GA (US); Derek Blagg, Lawrenceville, GA (US)

(73) Assignee: Varec, Inc., Norcross, GA (US)

( * ) Notice: Subject to any disclaimer, the term of this patent is extended or adjusted under 35 U.S.C. 154(b) by 0 days.

(21) Appl. No.: 11/039,310

(22) Filed: Jan. 20, 2005

(65) Prior Publication Data

US 2005/0159878 A1 Jul. 21, 2005

Related U.S. Application Data

(60) Provisional application No. 60/538,637, filed on Jan. 23, 2004, provisional application No. 60/537,677, filed on Jan. 20, 2004.

(51) Int. Cl.
*G06F 17/00* (2006.01)
*G06F 19/00* (2006.01)

(52) U.S. Cl. .............................. 701/3; 705/413; 701/1

(58) Field of Classification Search .................... None
See application file for complete search history.

(56) References Cited

U.S. PATENT DOCUMENTS

| | | | | |
|---|---|---|---|---|
| 1,867,602 | A | 7/1932 | Stukenborg | |
| 2,600,876 | A | 6/1952 | Jauch et al. | 222/23 |
| 2,769,575 | A | 11/1956 | Harman et al. | 222/71 |
| 3,028,010 | A | 4/1962 | Headrick | 210/172 |
| 3,323,534 | A | 6/1967 | Johnson et al. | 137/101.21 |
| 3,535,683 | A | 10/1970 | Woods et al. | 340/172.5 |
| 3,559,188 | A | 1/1971 | Proctor | 340/172.5 |
| 4,101,100 | A | 7/1978 | Smith et al. | 244/144 R |
| 4,186,381 | A | 1/1980 | Fleischer, et al. | 340/152 R |

(Continued)

FOREIGN PATENT DOCUMENTS

| | | |
|---|---|---|
| CH | 636566 | 6/1983 |

(Continued)

OTHER PUBLICATIONS www.controlink.com, Explosion Proof Antenna Fitting Product Specification, Jan. 13, 2005, 4 pp.

(Continued)

*Primary Examiner*—Michael J. Zanelli
(74) *Attorney, Agent, or Firm*—King & Spalding LLP

(57) ABSTRACT

A fueling agent operates a fueling agent client device for collecting and generating transaction data relating to a fueling transaction. The fueling agent client device transmits the transaction data to a fuel management server, for example, via a wireless communications link. The fuel management server stores the transaction data in a transaction record. The transaction data includes final fuel load data indicating an amount of fuel dispensed during the fueling transaction. Selected transaction data is retrieved from the transaction record and is delivered to a data communications system for transmission to a receiver. The receiver may be in the cockpit of an aircraft. An aircraft data communication system may be a digital data link system for transmitting data to and from the aircraft via VHF radio, such as ACARS. The fuel management server may communicate with an aircraft data communication system directly, or indirectly via an airline computer system.

45 Claims, 6 Drawing Sheets

U.S. PATENT DOCUMENTS

| | | | | |
|---|---|---|---|---|
| 4,269,240 | A | 5/1981 | Cutore | 141/392 |
| 4,313,168 | A | 1/1982 | Stephens et al. | 364/465 |
| 4,408,204 | A | 10/1983 | Salvesen | 340/870.24 |
| 4,575,803 | A | 3/1986 | Moore | 364/551 |
| 4,788,648 | A | 11/1988 | Ferretti et al. | 702/55 |
| 4,819,183 | A | 4/1989 | O'Brien et al. | 700/282 |
| 4,839,854 | A | 6/1989 | Sakami et al. | 364/900 |
| 4,850,223 | A | 7/1989 | Carlin et al. | 73/49.2 |
| 5,051,920 | A | 9/1991 | Reams et al. | 364/509 |
| 5,056,017 | A | 10/1991 | McGarvey | 705/28 |
| 5,065,013 | A | 11/1991 | Taylor | 250/231.18 |
| 5,103,225 | A | 4/1992 | Dolan et al. | 341/13 |
| 5,156,198 | A | 10/1992 | Hall | 141/94 |
| 5,195,554 | A | 3/1993 | Gaetano | 137/355.19 |
| 5,204,819 | A | 4/1993 | Ryan | 705/413 |
| 5,297,423 | A | 3/1994 | Keating et al. | 73/49.2 |
| 5,318,254 | A | 6/1994 | Shaw et al. | 244/134 |
| 5,400,253 | A | 3/1995 | O'Connor | 701/123 |
| 5,487,300 | A | 1/1996 | Brackett et al. | 73/61.59 |
| 5,579,233 | A | 11/1996 | Burns | 700/240 |
| 5,595,244 | A | 1/1997 | Roberts | 166/178 |
| RE35,793 | E | 5/1998 | Halpern | 702/62 |
| 5,859,416 | A | 1/1999 | Gatto | 235/384 |
| 6,119,058 | A * | 9/2000 | Anderberg | 701/29 |
| 6,370,488 | B1 * | 4/2002 | Beaudoin et al. | 702/188 |
| 6,370,515 | B1 | 4/2002 | Diamond et al. | 705/28 |
| 6,463,389 | B1 | 10/2002 | Dickson | 702/35 |
| 6,481,627 | B1 * | 11/2002 | Guerreri | 235/472.01 |
| 6,523,744 | B2 * | 2/2003 | Royal et al. | 235/381 |
| 6,546,314 | B1 | 4/2003 | Carr et al. | 700/244 |
| 6,681,362 | B1 * | 1/2004 | Abbott et al. | 714/755 |
| 6,708,562 | B2 | 3/2004 | Kruger et al. | 73/314 |
| 6,935,356 | B2 | 8/2005 | Shepard et al. | 137/1 |
| 6,975,964 | B2 | 12/2005 | Reichler et al. | 702/182 |
| 2002/0009993 | A1 * | 1/2002 | Dastrup et al. | 455/431 |
| 2002/0116299 | A1 | 8/2002 | Diamond et al. | 705/28 |
| 2003/0109973 | A1 * | 6/2003 | Hensey et al. | 701/35 |
| 2003/0191566 | A1 * | 10/2003 | Ben-Assa | 701/29 |
| 2003/0195676 | A1 | 10/2003 | Kelly et al. | 701/29 |
| 2005/0090969 | A1 * | 4/2005 | Siok et al. | 701/120 |
| 2005/0107897 | A1 | 5/2005 | Callaghan | 700/87 |
| 2005/0216139 | A1 * | 9/2005 | Laughlin et al. | 701/3 |
| 2005/0246275 | A1 * | 11/2005 | Nelson | 705/40 |

FOREIGN PATENT DOCUMENTS

| | | |
|---|---|---|
| DE | 3743393 | 3/1989 |
| FR | 2623181 | 5/1989 |
| GB | 2 128 569 | 5/1984 |
| JP | 2168735 | 6/1990 |
| JP | 4253695 | 9/1992 |
| JP | 4327199 | 11/1992 |
| JP | 6156599 | 6/1994 |
| JP | 11073353 | 3/1999 |
| WO | WO 94/14652 | 7/1994 |

OTHER PUBLICATIONS

PSM, "Tankview User's Guide," MAN019 Issue C, Jan. 2001, 16 pp.

"Flow-Tran, The Complete Fuel Management System," 14 pp., Mar. 1991.

Feinman, George and Sonenshein, Bernard, "Automated Fueling for the Jet-Age Airport," *IEEE Transactions on Industry and General Applications* , Applications, vol. IGA-6, No. 6, Nov./Dec. 1970.

"Shell International Trading Company, London, Aviation Operations & Communications System, Statement of Requirements," Sponsored by: ITA, 39 pp., Nov. 27, 1990.

* cited by examiner

FUEL INFORMATION MESSAGING SYSTEM

RELATED APPLICATIONS

The present application claims the benefit of the following United States provisional patent applications, each of which is incorporated herein by reference as if set forth herein in its entirety: (i) U.S. Provisional Patent Application No. 60/537,677 entitled "Data Collection for Fuels Management System," which was filed Jan. 20, 2004 and (ii) U.S. Provisional Patent Application No. 60/538,637 entitled "Fuel Information Messaging System," which was filed Jan. 23, 2004.

TECHNICAL FIELD

The present invention relates generally to an aviation fuel management system and more particularly to systems and methods for collecting, managing and storing aircraft fueling information.

BACKGROUND OF THE INVENTION

For safety, efficiency, accounting and other purposes, it is important for an airline to carefully track certain data throughout the aircraft fueling process. Such data, which is often referred to as "fuel ticket data," may include fueling transaction data, dispatch details, fuel load and aircraft information. Almost all airlines currently use a paper-based method for collecting, recording and communicating fuel ticket data. Using paper to manually record and communicate fuel ticket data is undesirable because paper records can be lost or misfiled and fuel ticket data can be written incorrectly or illegibly. In addition, fuel ticket data recorded on paper must be manually reentered into computer-based accounting systems.

An aircraft pilot requires fuel load information before aircraft departure so that the aircraft can be properly trimmed. Use of a paper-based method for collecting, recording and communicating fuel ticket data requires manual delivery of fuel ticket data to the pilot, typically in the form of a printed paper ticket. For example, the fueling agent may print a paper ticket containing fuel load information and may carry it to the gate agent to be given to the pilot. The manual exchange of a printed paper ticket adds additional time to the fueling process for each flight. If the paper ticket is lost at the gate, the fueling agent will need to re-print the ticket and return to the gate, adding further delay to the process.

In addition, requiring or allowing fueling agents to physically enter the airline terminal presents a potential security risk. Allowing fueling agents into the passenger gate area may also be undesirable because they may not be dressed in an appropriate manner to be seen by customers. Accordingly, airlines and aircraft fueling companies have a need for an automated system for collecting, managing and storing aircraft fueling information and for communicating fuel ticket data based thereon.

SUMMARY OF THE INVENTION

The present invention satisfies the above-described needs by providing an automated fuel information messaging system. A fueling agent operates a fueling agent client device for collecting and generating transaction data relating to a fueling transaction. The fueling agent client device may be a handheld or mobile computer. The fueling agent client device transmits the transaction data to a fuel management server. The fuel management server and the fueling agent client device may communicate via a wireless communications link. The fuel management server stores the transaction data in a transaction record.

In airline fueling embodiments, the fuel management server may be in communication with an airline computer system for retrieving flight schedule information and fuel planning information related to the fueling transaction. The fuel management server stores the flight schedule information and the fuel planning information in the transaction record. Fuel planning information specifies an amount of fuel to be dispensed, a configuration of the aircraft's fuel tanks, and any other information required by the fueling agent to perform the fueling transaction. The fuel management server periodically communicates with the airline computer system to retrieve any updated flight schedule information and any updated fuel planning information related to the fueling transaction, and stores any such updated information in the transaction record.

The fueling agent client device communicates with the fuel management server during the fueling transaction to receive selected transaction data from the transaction record. For example, in airline fueling embodiments, the fueling agent client device receives selected flight schedule information and fuel planning information from the transaction record. The fueling agent client device periodically communicates with the fuel management server during the fueling transaction to receive updates to previously received transaction data.

The transaction data generated by the fueling agent client device comprises final fuel load data indicating an amount of fuel dispensed during the fueling transaction. The final fuel load data may be determined based on fuel meter start/stop values and fuel tank gauge readings input to the fueling agent client device. Fuel meter start/stop values may be electronically transmitted to the fueling agent client device by a data collection unit connected to and configured for monitoring the fuel meter. In airline fueling embodiments, fuel tank gauge readings may be transmitted to the fuel management server from the cockpit computer via the aircraft data communications system. In turn, the fuel management server may transmit the fuel tank gauge readings to the fueling agent client device. Alternatively, a fueling agent may manually input the fuel meter start/stop values and fuel tank gauge readings into the fueling agent client device.

Prior to transmitting the final fuel load data to the fuel management server, the fueling agent client device may validate the final fuel load data based on one or more business rules. For example, a business rule may validate the amount of fuel dispensed only if it is determined that the amount of fuel dispensed is within a specified tolerance of the amount of fuel dispensed according to fuel tank gauges. After the fueling transaction is completed, selected transaction data is retrieved from the transaction record and is delivered to a data communications system for transmission to a receiver. For example, the transaction data may be delivered to an aircraft data communications system for transmission to a receiver in the aircraft cockpit. The receiver in the aircraft cockpit may be a cockpit computer and/or a cockpit printer. The aircraft data communication system may be a digital data link system for transmitting data to and from the aircraft via VHF radio. In particular, the aircraft data communication system may be the Aircraft Communication Addressing and Reporting System (ACARS).

In some cases, the selected transaction data may need to be encoded into an electronic message compatible with the data communications system. The encoding may be performed by an adapter or other interface accessible to the fuel management server. The fuel management server may itself communicate with the data communication system. Alternatively, the fuel management server may deliver the selected transaction data to a central computer system, which communicates the selected transaction data to the data communications system.

Additional aspects, features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

FIG. 2, comprising

FIG. 3, comprising

DETAILED DESCRIPTION OF EXEMPLARY EMBODIMENTS

The present invention provides systems and methods for collecting, managing and storing fueling information and for communicating "fuel ticket data" based thereon. Fueling information is stored in the form of fueling transaction records. Although the present invention is applicable to many industries, exemplary embodiments will be described in the context of the aircraft fueling industry. Those skilled in the art will appreciate that the various features and functions of the exemplary embodiments may be extended, with or without modification, to any application involving the fueling of a fleet or group of resources.

In the aircraft fueling context, a fueling transaction record may include some or all of the following data: the flight number, aircraft registration number (also referred to as ship number), flight destination, aircraft type, gate number, estimated time of departure, required fuel load for each tank, tolerance (the acceptable difference between the fuel tank gauge readings and the fuel pump meter readings, as described in more detail below) and product density (i.e., density of fuel to be dispensed). A fueling transaction record may also identify the assigned fueling agent and fueling vehicle (e.g., dispenser, fuel truck, fuel cart, tankers, etc.). Fuel ticket data, as the term is used herein, refers to some or all of the data stored in a fueling transaction record. The particular type or amount of fuel ticket data may vary depending on the needs of an airline, but in general will include dispatch details, fuel load and aircraft information and any other data collected or generated during the aircraft fueling process.

Using network communications technology and specialized software applications, the present invention provides mechanisms for fueling agents to collect and validate aircraft fueling information and to store that information in fueling transaction records. Fuel ticket data is then extracted from the fueling transaction records and is delivered, in electronic form, to an airline computer system and/or to an aircraft cockpit device. As an example, an airline computer system may be configured for printing of a fuel ticket at the aircraft gate. Aircraft cockpit devices can include cockpit computers, cockpit printers, etc.

Figure 1:
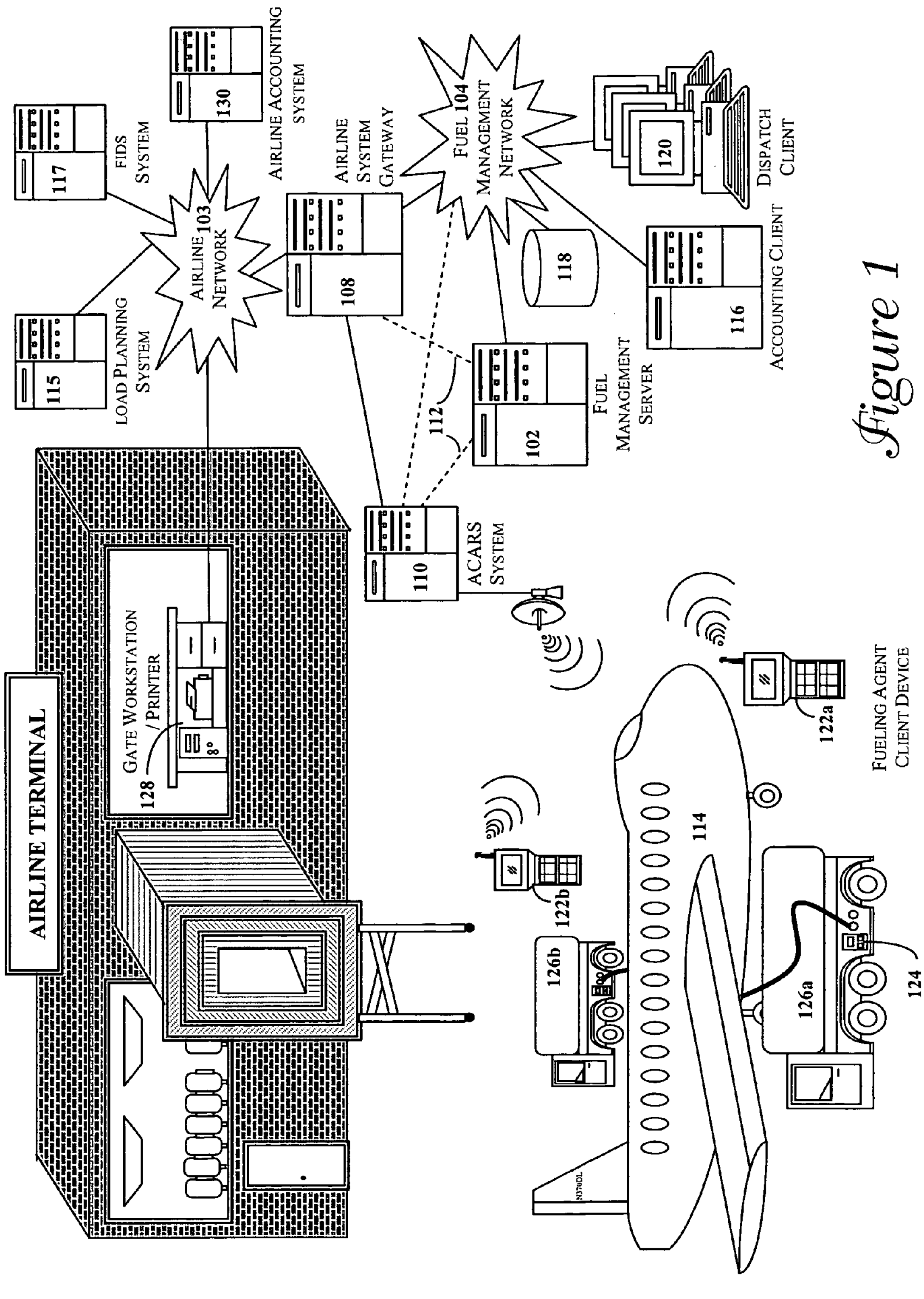
FIG. 1 is a block diagram of an exemplary aviation fuel management system which serves as an exemplary operating environment for the present invention.

Referring now to the attached figures, in which like numerals represent like elements, certain exemplary embodiments of the present invention will hereafter be described. FIG. 1 is a block diagram of an exemplary aviation fuel management system which serves as an exemplary operating environment for the present invention. As shown, the aviation fuel management system may be built on a client/server architecture. A fuel management server 102 performs the central management functions of the aviation fuel management system.

The fuel management server 102 is typically implemented as a software application running on a server computer or server cluster that contains or accesses a database and logic for fueling operations. The fuel management server 102 communicates via various communications links (which may be wired and/or wireless) with other components to collect and manage all system data, such as flight schedules, fuel planning information, reference data, aircraft configurations, transaction records and other accounting information. For example, the fuel management server 102 may communicate with various networked components via a wired and/or wireless network, referred to herein as the fuel management network 104. As shown in FIG. 1, the fuel management server 102 may communicate with an airline computer system, e.g., via an airline system gateway 108 connected to an airline network 103. The fuel management server 102 may communicate with the airline system gateway 108 and/or an Aircraft Communications Addressing and Reporting ("ACARS") system 110 via connections to the fuel management network 104 or via separate communication links 112.

Via the airline system gateway 108, the fuel management server 102 receives aircraft fuel planning information from the airline's load planning system 115 and flight information from the airline's flight information display system (FIDS) 117. The flight information can be used to determine where and when fueling services are needed. Fuel planning information specifies the amount of fuel to be dispensed (i.e., required fuel load), the configuration of the aircraft's fuel tanks, and all other information required by a fueling agent to fuel an aircraft. The fuel management server 102 may actively request such information from the load planning system 115 and the FIDS 117, or may passively receive the information. The fuel management server 102 stores its own copy of the fuel planning information and flight information (e.g., in database 118). The fuel management server 102 periodically synchronizes its local copy of the fuel planning information and flight information with updated information from the airline computer system.

The ACARS system 110 is a well-known digital data link system for communicating information via VHF radio between ground-based transmitting/receiving stations and cockpit devices. By interfacing with the ACARS system 110, the fuel management server 102 can send electronic message to and receive electronic messages from aircraft cockpit devices. In order to interface with the ACARS system 110, the fuel management server 102 may include appropriate encoders and/or decoders to translate or interpret electronic messages to/from the standardized ACARS messaging protocol. Alternatively, one or more other devices (separate from but in communication with the fuel management server 102) may provide the appropriate encoding/decoding functionality. In other embodiments, the ACARS system 110 may be replaced by another suitable data link system for communicating information between ground-based transmitting/receiving devices and cockpit devices.

The fuel management server 102 may execute several services, including a dispatch server, an accounting server and various administrative client programs. As shown in FIG. 1, an accounting client 116 and a dispatch client 120 may be provided for interaction with the accounting server and the dispatch server components, respectively, of the fuel management server 102. A client device may be any workstation or mobile computing device configured with appropriate client-side software. Any of the services provided by the fuel management server 102 may alternatively be provided by one or more separate network components. As also shown, a database 118 for storing fueling transaction records and other system data may be connected to the fuel management network 104.

In certain exemplary embodiments, a dispatcher accesses the fuel management server 102 by way of the dispatch client 120. Using the dispatch client 120, the dispatcher is able to access selected flight information and corresponding fuel planning information from the fuel management server 102 and to use that information to create fueling transaction records.

At a busy airport, flight schedules, fueling assignments, etc. change often, which requires the dispatcher to resend fueling information to the appropriate fueling agents for every change. Therefore, the fuel management server 102 stores (e.g., in the database 118) and manages the transaction records for all fueling transactions. As stated above, the fuel management server 102 periodically receives updated flight information and fuel planning information from the airline computer system. Preferably, the fuel management server 102 automatically updates each fueling transaction record with any appropriate updated flight information and/or fuel planning information. Alternative, the dispatcher can use the dispatch client 120 to update the fueling transaction records.

A copy of each fueling transaction record is dispatched to a desired fueling agent client device 122. The fuel management server 102 may mark fueling transaction records (e.g., stored in database 118) as having been dispatched to the assigned fueling agent client device 122. If the assigned fueling agent client device 122 fails or discards the transaction record before completing the fueling transaction, the transaction record may be marked as being available again so that another fueling agent client device 122 may complete the fueling transaction at a later time. Each fueling agent client devices 122 periodically communicates with the fuel management server 102 to determine if the fueling transaction record has been updated. If so, the fueling client device 122 receives a copy of the updated data and updates its local copy of the fueling transaction record.

Dispatching a fueling transaction record may involve making the transaction record available for delivery to the fueling agent client device 122 when the fueling agent client device 122 communicates with the fuel management server 102. In other embodiments, dispatching a fueling transaction record may involve actively pushing the transaction record directly to a fueling agent client device 122 or to an account or mailbox to be accessed by the fueling agent client device 122. A fueling agent client device 122 may comprise any workstation or mobile computing devices. The use of mobile computing devices (e.g., handheld computers, laptop computer, fueling vehicle-mounted computer, etc.) as fueling agent client devices 122 provides greater mobility for the fueling agents, which can increase the efficiency of the aircraft fueling process.

The fueling agent may be required to input a user identification code and/or password in order to log-in to the fueling agent client device 122. Other security features and access restrictions may be implemented at the fueling agent client device 122 as well. Additional security for the fuel management system may be provided through the use of secured server networks and other firewall configurations. Authentication of the fueling agent's credentials may be performed at the fuel management server 102, locally at fueling agent client device 122, or at another suitable device. Once logged-in to the fueling agent client device 122, the fueling agent views the fueling transaction record dispatched by the dispatch client 120.

In response to receiving the fueling transaction record from the fuel management server 102, the software executed by the fueling agent client device 122 presents a sequence of display screens that guide the fueling agent through the aircraft fueling process. In general, the information presented by the display screens of the fueling agent client device 122 prompts the fueling agent to enter the aircraft fuel gauge readings before and after the fueling. The aircraft fuel gauges provide the weight of the fuel in each tank of an aircraft. In certain embodiment, the pre-fueling aircraft gauge reading may be electronically transmitted to the fueling agent client device 122. For example, the fuel management server 102 may obtain the pre-fueling aircraft gauge reading directly or indirectly from the ACARS system 110 and may store the readings in the transaction record.

One of the most prevalent problems with aircraft fueling is inoperable gauges on the aircraft. Current airline procedures require the fueling agent to work with a supervisor to manually measure the amount of fuel in tanks with inoperable gauges using a dipstick. The fueling agent reads the measurement from the dipstick and looks up the fuel weight for that tank in a book containing strapping tables to correlate length to weight or vice versa. This manual process is slow and prone to error.

The fuel management server 102 may therefore be configured for automating inoperable gauge calculations using strapping tables stored in the database 118. Once the fueling agent recognizes an inoperable gauge, he or she inputs the dipstick measurement into the fueling agent client device 122, which sends the measurement to the fuel management server 102. The fuel management server 102 then performs the calculation based on the strapping tables and the calculated fuel weight back to the fueling agent client device 122. In other instances, the fueling agent client device 122 sends the fuel weight to the fuel management server 102 and the fuel management server 102 calculates the dipstick measurement, allowing the fueling agent to fill a tank to a specific weight requirement.

During the aircraft fueling process, the fueling agent is also prompted to enter the starting and ending meter values from the meter on the fueling vehicle 126. Optionally, the fueling agent client device 122 may be configured for communication with a data capture unit ("DCU") 124 that interfaces to the meter on the fueling vehicle 126. The DCU 124 electronically records the starting meter value before the fueling begins and the ending meter value when the fueling is completed. An example of a DCU is disclosed in co-pending U.S. patent application Ser. No. 11/039,570, which is incorporated herein by reference as if set forth herein in its entirety. An exemplary DCU is commercially available from Varec, Inc. of Norcross, Ga. The fueling agent client device 122 may communicate with a DCU 124 via a wireless or wired communication link. Again, a wireless link may be preferred because it provides greater mobility for the fueling agent, which can increases the efficiency of the aircraft fueling process.

The fueling agent client device 122 may prompt the fueling agent to input certain other information during the aircraft fueling process, for example for local or remote verification that the fueling agent is at the right gate, is fueling the correct aircraft, is dispensing the proper fuel, etc. In order to simplify the data input process, reference data may be stored on each fueling agent client device 122. Reference data may include aircraft information, gate numbers, vehicle identifications, product identifiers, ship numbers, IATA codes, etc. Relevant reference data may be displayed in the form of tables, menus and other selection lists in order to reduce the amount of typing required from the fueling agent. The fuel management server 102 stores and manages a master copy of all reference data. A system administrator or other authorized user may add, remove or edit the master copy of the reference data, which may be automatically synchronized with the local copy stored on each fueling agent client device 122.

During the fueling process, the fueling agent client device 122 may collect various status indicators. Status indicators may indicate, for example, that the fueling agent has accepted the fueling transaction, the time that the fueling agent arrives at the aircraft to be fueled, the time that the fueling agent starts fueling the aircraft, the time that the fueling agent stops fueling the aircraft, and the time that the fueling agent departs the aircraft. These and other status indicators may be collected by way of prompting the fueling agent for user input, or may be collected automatically if the fueling agent client device 122 is equipped with hardware and/or software monitors for detecting the corresponding external events. The status indicators may be sent to the fuel management server 102 in real time as they are generated, or as part of a subsequent batch transmission or delivery. Status indicators may be displayed on the dispatch client 120 in order to keep the dispatcher apprised of the status the fueling transaction.

When the fueling agent completes the physical fueling operation, the fueling agent client device 122 validates the final fuel load data by using a predefined and configured set of industry standard business rules. For example, a primary business rule may prevent the fueling agent from completing the fueling transaction if the difference between the aircraft fuel tank gauge readings and the fuel pump meter readings exceeds a specified tolerance (as described in more detail below). Other business rules may optionally include: (i) ensuring that the final fuel load does not exceed the capacity for each fuel tank; (ii) ensuring that the difference between the percentage of filled capacity for the tanks on the left and right sides of the aircraft is less than a configured allowable value; (iii) ensuring that the percentage difference between the final fuel load and the required (requested) fuel load is less than a configured allowable value; and (iv) ensuring that the final fuel load is greater than or equal to the required (requested) fuel load. These and other business rules may be implemented by the fueling agent client device 122 to validate the final fuel load data. In some embodiments, the fueling agent client device 122 may generate audible or visual indicators (alarms, warning, etc.) or may generate output commands (e.g., to be sent to a DCU 124) for prohibiting or automatically terminating fueling if certain business rules are violated.

If the final fuel load data validation is unsuccessful, the fueling agent may need to make appropriate corrections (e.g., adjusting the aircraft fuel level, correcting or providing additional fuel meter readings or fuel tank gauge values data, etc.). When the final fuel load data validation is successful, the fueling agent client device 122 allows the fueling agent to complete the fueling process. While the fueling agent is positioned at the wingtip, the fueling agent client device 122 can transfer the final fuel load data to the fuel management server 102 via a wireless communication link (e.g., wireless connection to fuel management network 104) to be stored in the fueling transaction record. Alternatively, the final fuel load data may be transferred from the fueling agent client device 122 to the fuel management server 102 by other means, such as via a hard-wired connection or by way of a portable memory storage device (e.g., a removable memory card).

The fuel management server 102 may optionally send final fuel load data to a weights and balances system for verification that the aircraft has been properly fueled. The weights and balances system may be integrated with the load planning system 115 of the airline network 103 (as shown in FIG. 1) or otherwise integrated with or connected to the fuel management server 102. If the weights and balances system indicates that the aircraft has not been properly fueled, the fuel management server 102 transmits an appropriate error message to the fueling agent client device 122. An error message may indicate, for example, that too much or too little fuel has been added to one or more of the aircraft fuel tanks. As another example, the error message may prompt the fueling agent to re-check the aircraft gauges and/or fuel pump meters. Any other appropriate error message may similarly be transmitted by the fuel management server 102.

After receiving the final fuel load data (and optionally verifying the data with a weights and balances system) and storing it in the corresponding fueling transaction record, the fuel management server 102 completes a search for available "adapters." Adapters are standard or custom software interfaces that communicate fuel ticket data to an airline's computer system and/or third-party applications and devices, such as printers, displays devices, etc. For example, an adapter can be implemented as a conventional printer driver for transmitting fuel ticket data to a printer for printing a paper ticket. Similarly, a conventional video interface can be used as an adapter for communicating fuel ticket data to video display for presentation in electronic format. In response to identifying an available adapter, the fuel management server 102 extracts the fuel ticket data from the transaction record and submits it to the adapter, which then routes the fuel ticket data through the appropriate interface to a printer, electronic display, computer system, or other device.

To facilitate delivery of fuel ticket data to the aircraft pilot, adapters can be provided for communicating fuel ticket data to a gate workstation and/or printer 128. Paper tickets can be printed in a standard format or a custom format specified by the airline. The paper ticket can be presented to the pilot before he or she boards the aircraft, or can be delivered to the cockpit by a gate agent. Alternatively (or additionally) an adapter may be provided for communicating fuel ticket information to a printer located at the fueling vehicle 126 or other location accessible to the fueling agent. As another alternative (or additional) option, an adapter may be provided for transferring fuel ticket data to the airline computer system, which, in turn, routes the fuel ticket data to an appropriate printer for presentation at the aircraft to the pilot.

In certain embodiments, the fuel ticket data is electronically transmitted to the cockpit of the aircraft 114. For example, the fuel management server 102 may be configured to forward the fuel ticket data to an adapter that interfaces directly to an ACARS system 110, which encodes the fuel ticket data into an electronic message delivered to a cockpit computer. Alternatively, a custom adapter can be used to transfer the fuel ticket data to the airline computer system which, in turn, routes the fuel ticket data the ACARS system 110. In still other alternative embodiments, the fueling agent client device 122 may be configured with a specific interface for sending the fuel ticket data to a printer, electronic display or computer inside the aircraft 114. By way of example, the fuel ticket data may be transmitted from the fueling agent client device 122 to the aircraft 114 via a wireless communication link.

The fuel management server 102 may transmit fuel ticket data and other transaction data to an airline accounting system 130 and/or third-party accounting systems. For example, the fuel management server 102 may generate billing information for a fueling transaction. To generate billing information the fuel management server 102 may accesses internal lookup tables using information such as fueling vehicle identification numbers, aircraft registration numbers and gates, the supplier, buyer, owner and vendor for the fuel. The fuel management server 102 may generate and/or collect other types of transaction data as well.

Figure 2A:
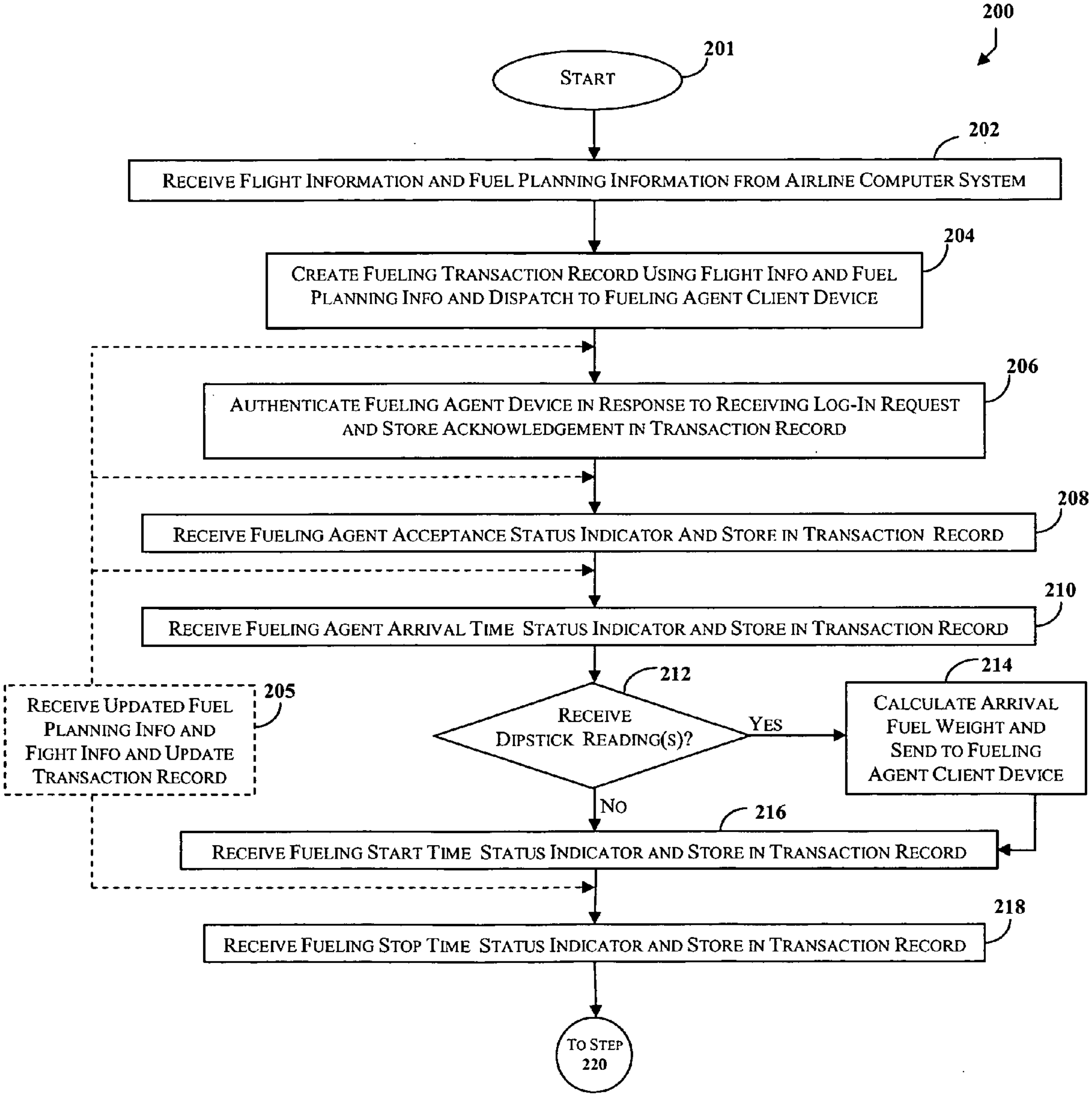
FIG. 2*a* and FIG. 2*b*, is a flow chart illustrating an exemplary method for managing fuel ticket data and other transaction data, in accordance with certain exemplary embodiments of the present invention.
Figure 2B:
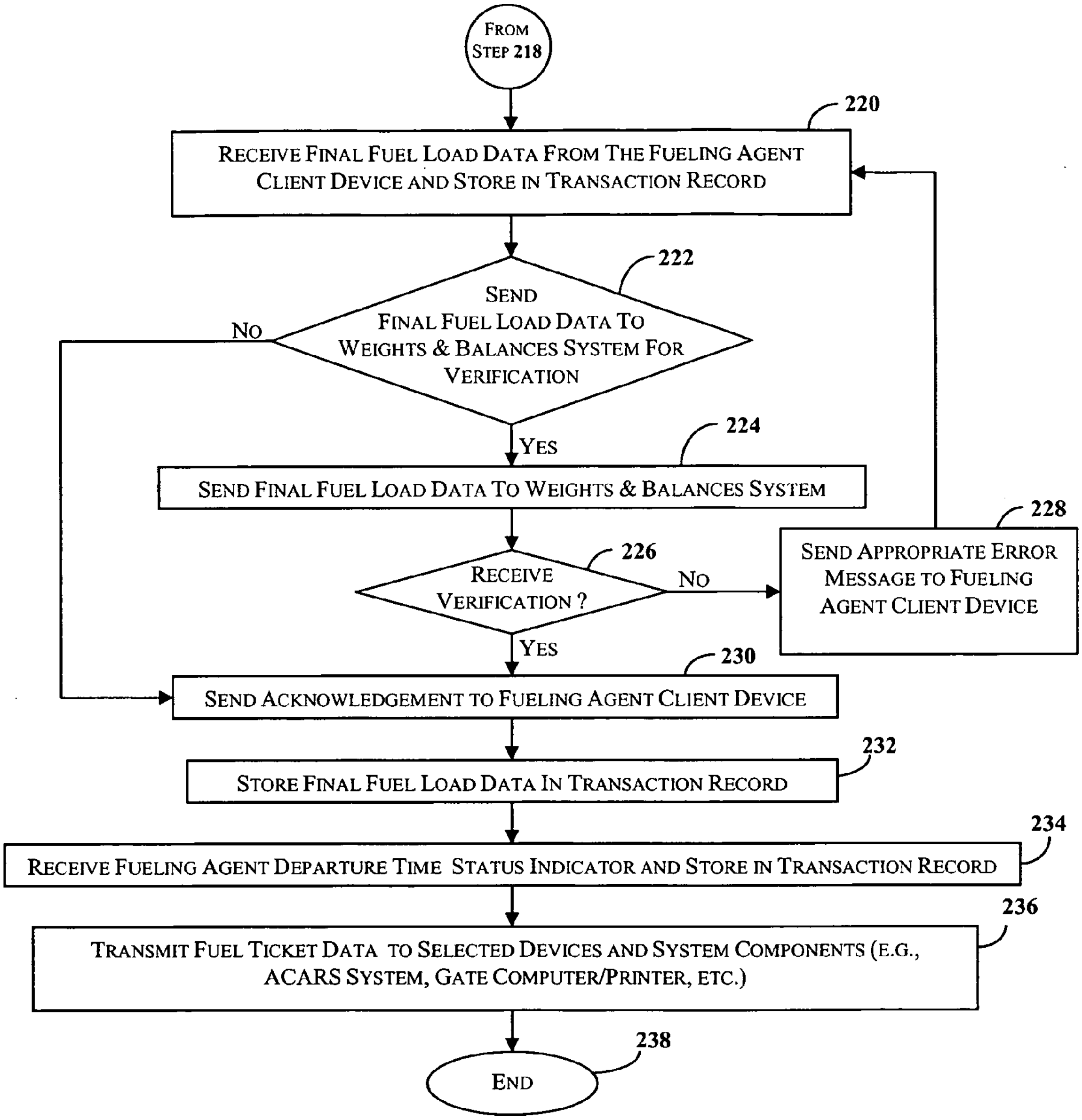

FIG. 2 is a flow chart illustrating an exemplary method for managing fuel ticket data and other transaction data. The exemplary method 200 begins at starting block 201 and proceeds to step 202, where flight information and fuel planning information is received from an airline computer system. Next at step 204, selected flight information and fuel planning information is used to create a fueling transaction record, which is dispatched or assigned to a fueling agent client device 122. The fueling transaction record is stored in a database 118 accessible by the fuel management server 102.

At step 205, a background process is initiated, which periodically checks the airline computer system or otherwise listens for updated flight information and/or fuel planning information and updates the fueling transaction records as appropriate. This background process is performed throughout the exemplary method 200 in order to ensure that the transaction records are up to date. Fueling agent client devices 122 continuously communicate with the fuel management server 102 in order to synchronize previously dispatched transaction records with the copies stored in the database 118. As one example, fueling agent client devices 122 may request updated data from the fuel management server 102 at predefined intervals (e.g., five-second intervals).

The method next proceeds to step 206 for authentication of a fueling agent client device 122. As mentioned above, for security purposes, the fueling agent may be required to input a user identifier and/or password into the fueling agent client device 122. Authentication of the fueling agent's credentials may be performed at the fuel management server 102 as part of the method for managing fuel ticket data. Alternatively, the authentication can be performed locally at the fueling agent client device 122 or at another device. An acknowledgment of the authentication may be stored in the transaction record.

Next at step 208, a fueling agent acceptance status indicator is received indicating that the fueling agent has acknowledged and will perform the fueling transaction. At step 210, a fueling agent arrival time status indicator is received to indicate the time that the fueling agent arrived at the aircraft to be fueled. In certain embodiments, fueling agent arrival time status indicator may be generated by the fueling agent client device 122 after verifying the aircraft nose/tail number input by the fueling agent. The fueling agent arrival time status indicator is stored in the transaction record.

Next at step 212, a determination is made as to whether a dipstick reading has been received from the fueling agent client device along with an indication that aircraft fuel tank gauges are inoperable. A dipstick reading will be received in cases where the fueling agent cannot determined the arrival fuel weights from the aircraft fuel tank gauges. If the fueling agent can determine the arrival fuel weights from the aircraft fuel tank gauges, no dipstick reading will be received at step 212 and the method will skip to step 216. However, if a dipstick reading is received, the method proceeds to step 214, where strapping tables stored in the database 118 are consulted to determine the appropriate fuel weights based on the dipstick reading and the fuel weight is sent back to the fueling agent client device 122. From step 212 or step 214, the method moves to step 216, where a fueling start time status indicator is received and is stored in the transaction record. Then at step 218, a fueling stop time status indicator is received.

Next at step 220, final fuel load data is received from the fueling agent client device 122 and is stored in the transaction record. Final fuel load data includes a fuel-weight-added value and may also include a fuel-volume-added value. In some embodiments, the final fuel load data may also include fuel meter start/stop values and/or fuel tank gauge readings. Final fuel load data has preferably been validated against selected business rules at the client device 122. At step 222, a determination is made as to whether the final fuel load data should be subject to further verification by a weights and balances system. If the final fuel load data is to be verified, it is sent to the weights and balances system at step 224 and a verification notice is awaited at step 226. If the final fuel load data is not verified by the weights and balances system, an appropriate error message is transmitted to the fueling agent client device 122 at step 228 and from there the method returns to step 220 to await receipt of new final fuel load data.

When a verification message is received from the weights and balances system at step 226, or if it was determined at step 222 that verification by the weights and balances system was not required, the method advances to step 230 where an acknowledgement is sent to the fueling agent client device to indicate that the fueling transaction has been successfully completed. Then, at step 232 a copy of the final fuel load data is stored in the transaction record in database 118. At step 234, a fueling agent departure status indicator indicating the time at which the fueling agent leaves the aircraft is received and is stored in the transaction record as well. At step 236, the final fuel load data is transmitted to selected devices and system components (e.g., ACARS system 110, gate workstation/printer 128, etc.) via appropriate adapters and interfaces. After transmitting the final fuel ticket data to selected devices and system components, the exemplary method ends at step 238.

Figure 3A:
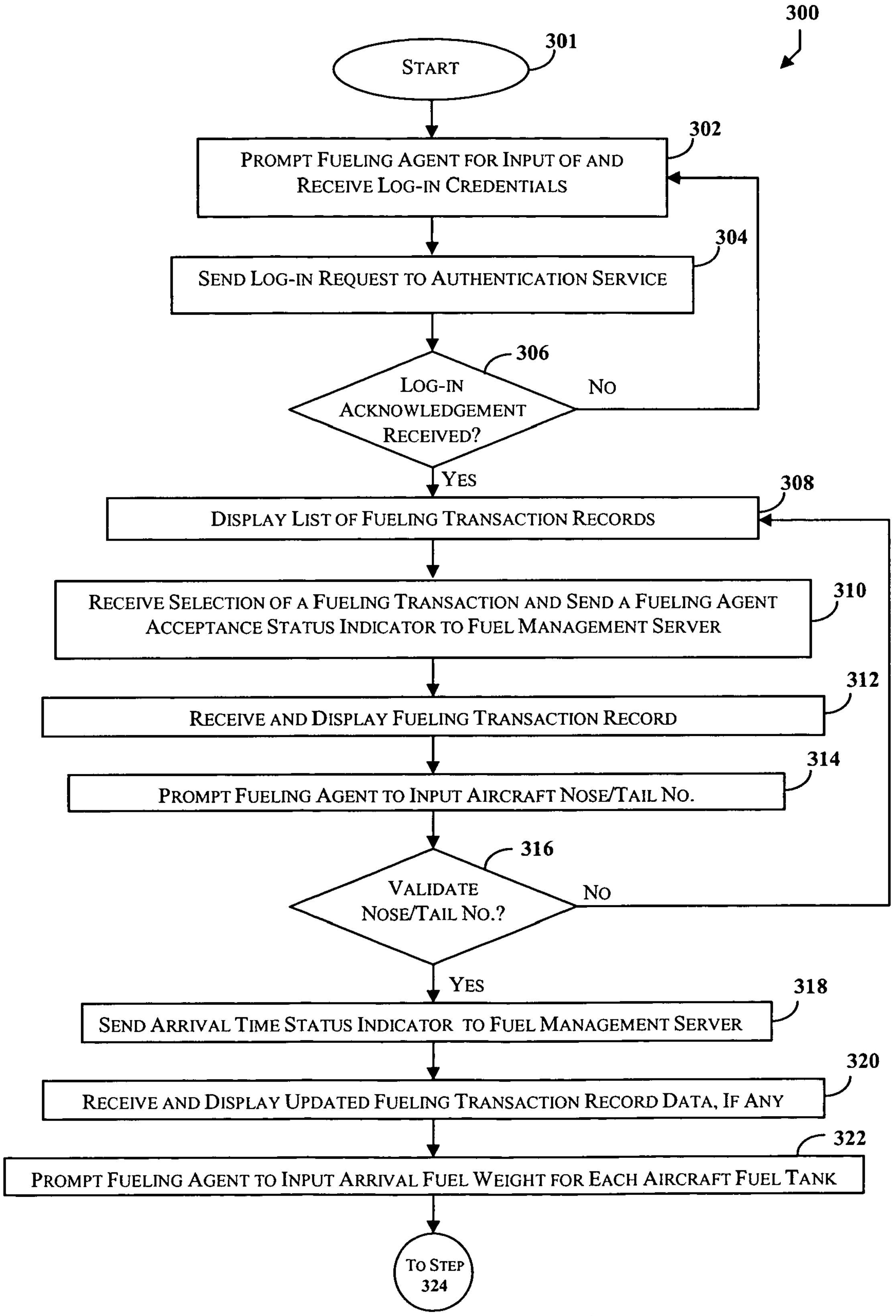
FIG. 3*a*, FIG. 3*b* and FIG. 3*c*, is a flow chart illustrating an exemplary method for collecting and communicating fueling transaction data by a fueling agent client device, in accordance with certain exemplary embodiments of the present invention.
Figure 3B:
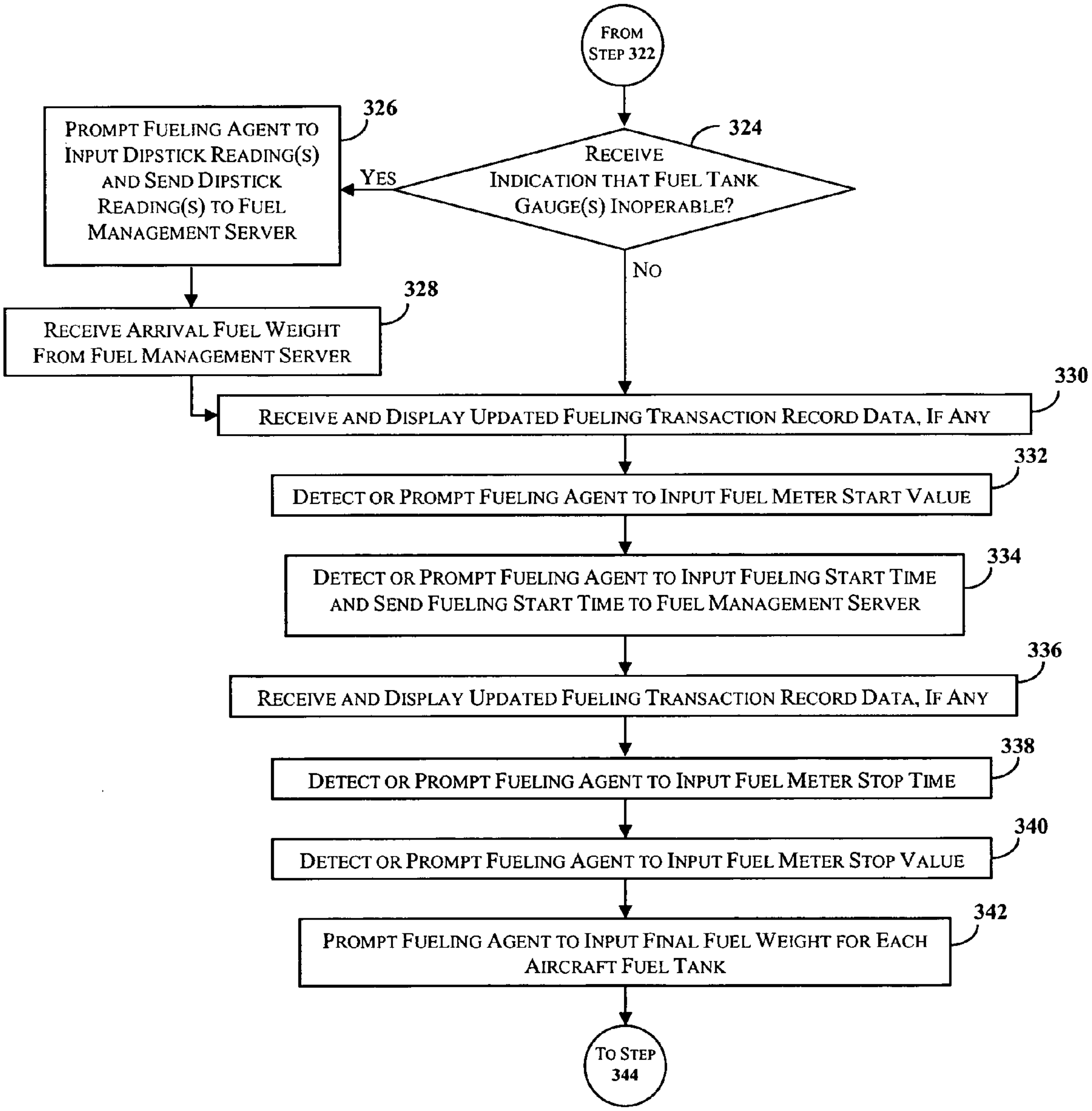
Figure 3C:
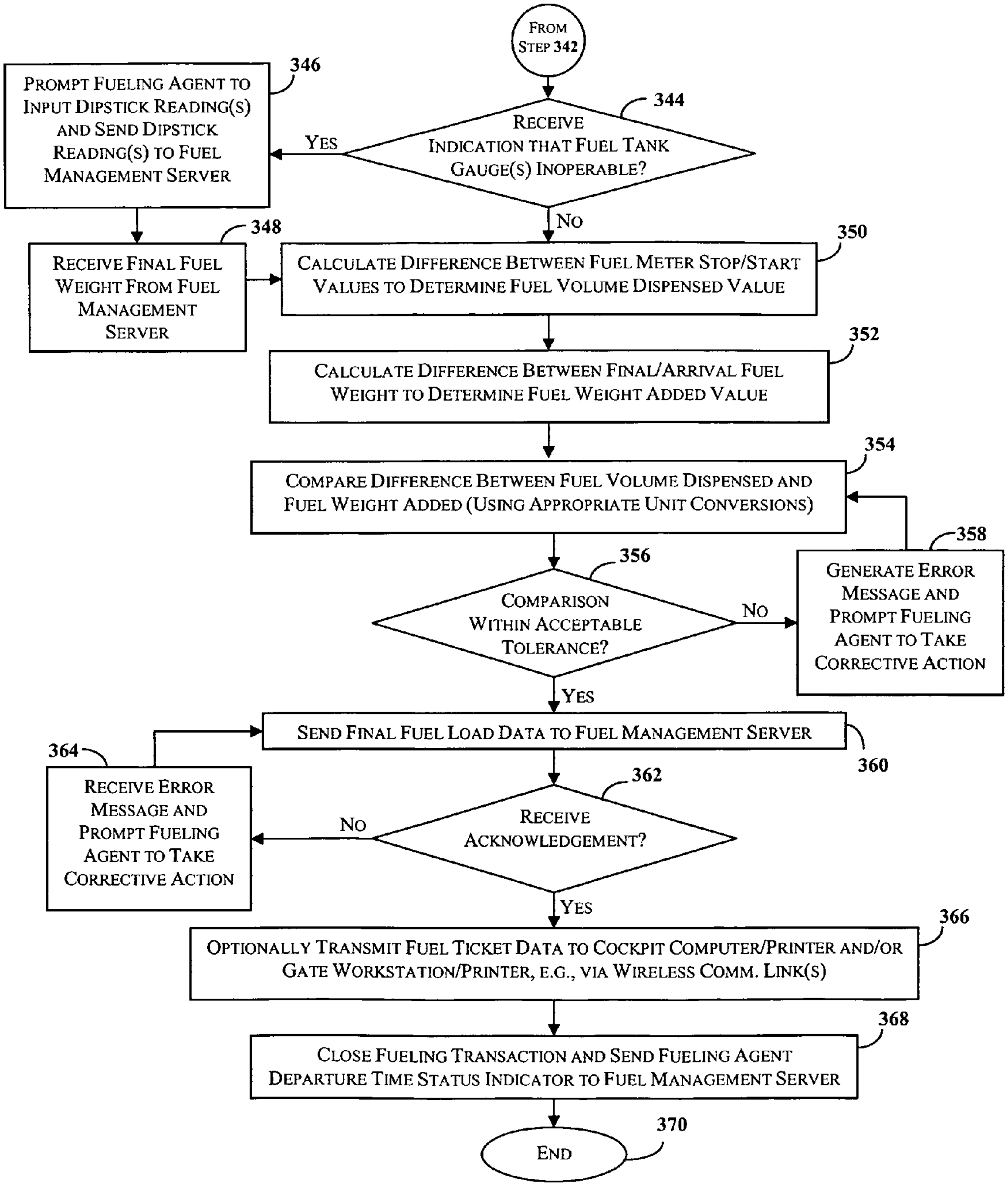

FIG. 3 is a flow chart illustrating an exemplary method for collecting and communicating fueling transaction data by a fueling agent client device 122. The exemplary method 300 begins at starting block 301 and advances to step 302, where the fueling agent is prompted for input of his or her log-in credentials (e.g., user identifier and/or password) and such credentials are received. Next at step 304, a log-in request is sent to an authentication service which, for example, may be executed by the fuel management server 102. The log-in request includes the fueling agent's log-in credentials, which may be encrypted, encoded, time-stamped, etc. Alternatively, authentication of the fueling agent's credentials may be performed locally by the fueling agent client device 122. At step 306, it is determined whether a log-in acknowledgment has been received. If a log-in acknowledgement is not received, the method returns to step 302 where the fueling agent is again prompted for input of log-in credentials.

When a log-in acknowledgement is received at step 306, the method proceeds to step 308, where a list of one or more available fueling transactions is displayed. Fueling transactions may be identified by flight number or any other suitable identifier. In response to receiving an input command for selection of an available fueling transaction at step 308, a fueling agent acknowledgment status indicator is generated and sent to the fuel management server 102 for storage in the fueling transaction record corresponding to the selected fueling transaction. Next at step 312, a copy of the transaction record corresponding to the selected fueling transaction is received and displayed. The fueling transaction record may be transmitted to or retrieved by the fueling agent client device 122 from the fuel management server 102. In some embodiments, the transaction record may be stored in a mailbox or other account associated with the fueling agent.

At step 314, the fueling agent is prompted to enter the nose/tail number of the aircraft to be fueled. The nose/tail number is preferably validated locally at the fueling agent client device 122, based on data stored in the fueling transaction record. In other embodiments, the nose/tail number may be sent to the fuel management server 102 or other device for validation. If the nose/tail number is not validated at step 316, the method returns to step 308 where the list of available fueling transactions re-displayed for the fueling agent. If the nose/tail number is validated at step 316, the method moves to step 318 where a fueling agent arrival time status indicator is generated and sent to the fuel management server 102 for storage in the transaction record.

Updated fueling transaction data may be periodically received or retrieved from the fuel management server 102, in order to ensure that the fueling agent has the most current data. Thus, at step 320 any updated fueling transaction data is received and displayed. Then at step 322 the fueling agent is prompted to input the arrival fuel weight for each aircraft fuel tank, as indicated by the aircraft fuel tank gauges. Step 322 may be skipped if the arrival fuel weight for each fuel tank can be received in electronic form. As described above, the arrival fuel weight may be received from the airline computer system via the ACARS system 110 (which communicates with the cockpit computer) or directly from the cockpit computer via a wireless or wired communication link.

If one or more of the aircraft fuel tank gauges is inoperable, the fueling agent will not be able to input the arrival fuel weight at step 322. Instead, the fueling agent may input a command to indicate that the gauges are inoperable. If an indication that the gauges are inoperable is received at step 324, the method moves to step 326 where the fueling agent is prompted to enter a dipstick measurement for each fuel tank and the dipstick measurement(s) are sent to the fuel management server 102 for calculation of the arrival fuel weight. The arrival fuel weight is received from the fuel management server 102 at step 328. From step 328 or step 324, the exemplary method proceeds to step 330 where any updated fueling transaction data is received from the fuel management server 102 and is displayed for the fueling agent.

At step 332 the fueling agent is next prompted to input the fuel meter start value. Step 332 may be skipped if the fuel meter start value can be received in electronic form, for example via a wireless or wired communication link from a DCU 124 connected to the fuel meter. After the arrival fuel weight and the fuel meter start value are received, the fueling agent may begin fueling the aircraft. At step 334 the fueling start time is detected automatically (e.g., by receiving a signal from a DCU 124) or in response to an input command by the fueling agent. The fueling start time status indicator is sent to the fuel management server 102 for storage in the transaction record. At step 336 any updated fueling transaction data is again received from the fuel management server 102 and is displayed. At step 338, the fueling stop time is detected automatically (e.g., by receiving a signal from a DCU 124) or in response to an input command by the fueling agent. At step 340, the fueling agent is prompted to input the fuel meter stop value.

At step 342, the fueling agent is prompted to input the final fuel weight for each fuel tank, as indicated by the aircraft fuel tank gauges. Again, if one or more of the aircraft fuel tank gauges is inoperable, the fueling agent will not be able to input the arrival fuel weight at step 342. Instead, the fueling agent may input a command to indicate that the gauges are inoperable. If an indication that the gauges are inoperable is received at step 344, the method moves to step 346 where the fueling agent is prompted to enter a dipstick measurement for each fuel tank and the dipstick measurement(s) are sent to the fuel management server 102 for calculation of the final fuel weight. The final fuel weight is received from the fuel management server 102 at step 348.

Steps 340 and/or 342 may be skipped if the final fuel weight and/or fuel meter stop value can be received in electronic form, as described above with respect to the arrival fuel weight and the fuel meter start value. After the final fuel weight and the fuel meter stop value are received, the method advances to step 350, where the difference between the fuel meter stop value and the fuel meter start value is calculated in order to determine fuel-volume-dispensed value. Then at step 352, the difference between the final fuel weight and the arrival fuel weight is calculated to determine a fuel-weight-added value.

At step 354, the fuel-volume-dispensed value and the fuel-weight-added value are compared, using the appropriate unit conversion. The fuel-volume-dispensed value is typically expressed in volumetric units. Therefore, the fuel-volume-dispensed value must be converted to weight or the fuel-weight-added value must be converted to volume in order for the comparison to be performed. If the difference between the fuel-volume-dispensed and the fuel-weight-added is determined at step 356 to not be within an acceptable tolerance, the method proceeds to step 358, where an appropriate error message is displayed and the fueling agent is prompted to take appropriate corrective action. By way of example, the fueling agent may be prompted to add or remove fuel from one or more aircraft fuel tanks and/or to re-input the final fuel weight and/or the fuel meter stop value.

After the fueling agent takes the appropriate corrective action and re-inputs all required data, the method returns to step 354 where the fuel-volume-dispensed value and the fuel-weight-added value are again compared. Depending on the nature of the corrective action required, certain status indicators may need to be recaptured and sent to the fuel management server 102. For example, the fueling stop time status indicator may need to be recaptured if the fueling agent is required to dispense additional fuel. When it is finally determined at step 356 that the difference between the fuel-volume-dispensed and the fuel-weight-added is within an acceptable tolerance, the final fuel load data is sent to the fuel management server 102 at step 360.

At step 362 an acknowledgement of the final fuel load data is awaited from the fuel management server 102. As mentioned above, the fuel management server 102 may perform a verification of the final fuel load data, for example using a weights and balances system. If fuel management server 102 attempts to but cannot verify the final fuel load, an acknowledgement will not be received at step 362. Rather, an appropriate error message will be received at step 364 and the fueling agent will be prompted to take appropriate corrective action. By way of example, the fueling agent may be prompted to add or remove fuel from one or more aircraft fuel tanks and/or to re-input the final fuel weight and/or the fuel meter stop value. After the fueling agent takes the appropriate corrective action and re-inputs all required data, the method returns to step 354 (described above).

When an acknowledgement of the final fuel load data is finally received at step 362, the method proceeds to step 366, where the final fuel load data may optionally be transmitted to the cockpit computer/printer and/or the gate workstation/printer 128. As described above, the fueling agent client device 122 may be configured for wireless communications with the cockpit computer and/or the gate workstation/printer 128, either directly of via the fuel management server 102. In other embodiments, a wired communication link may be temporarily provided between the fueling agent client device, the cockpit computer/printer and/or the gate workstation/printer 128. In still other embodiments, a removable portable memory device (e.g., a memory card or disk) may be transferred from the fueling agent client device 122 to the cockpit computer/printer and/or the gate workstation/printer 128. After optional step 366 is performed (or not), the fueling transaction is closed at step 368 and a fueling agent departure time status indicator is generated and sent to the fuel management server 102. After closing the fueling transaction, the exemplary method ends at step 370.

Those skilled in the art will appreciate that the exemplary methods of FIG. 2 and FIG. 3 are meant to illustrate certain, but not all, embodiments for performing the method of the present invention. In other embodiments, the sequence of certain method steps may be altered and/or additional steps may be added and/or certain illustrated steps may be deleted. In addition, certain of the above-described method steps may be performed by a fueling agent client device 122 rather than the fuel management server 102, and vice versa, in some embodiments. Therefore, the particular sequences of steps illustrated in FIG. 2 and FIG. 3 are not intended to limit the scope of the present invention.

Based on the foregoing, it can be seen that the present invention provides methods and systems for collecting, managing, communicating and storing aircraft fueling information. Many other modifications, features and embodiments of the present invention will become evident to those of skill in the art. It should be appreciated, therefore, that many aspects of the present invention were described above by way of example only and are not intended as required or essential elements of the invention unless explicitly stated otherwise. Accordingly, it should be understood that the foregoing relates only to certain embodiments of the invention and that numerous changes may be made therein without departing from the spirit and scope of the invention as defined by the following claims. It should also be understood that the invention is not restricted to the illustrated embodiments and that various modifications can be made within the scope of the following claims.

What is claimed is:

1. A fuel information messaging system comprising:

a fueling agent client device wirelessly connected to a vehicle for dispensing fuel, for collecting and generating transaction data relating to a fueling transaction;

a fuel management server for receiving said transaction data from the fueling agent client device and storing it in a transaction record; and a data communications system for receiving selected transaction data from the fuel management server and for transmitting said selected transaction data to a receiver.

2. The fuel information messaging system of claim 1, wherein the data communications system comprises an aircraft data communications system; and wherein the receiver is located in the cockpit of an aircraft.

3. The fuel information messaging system of claim 2, wherein the aircraft data communication system comprises a digital data link system for transmitting data to and from the aircraft via VHF radio.

4. The fuel information messaging system of claim 3, wherein the aircraft data communication system comprises Aircraft Communication Addressing and Reporting System.

5. The fuel information messaging system of claim 2, wherein the receiver in the aircraft cockpit comprises a cockpit computer.

6. The fuel information messaging system of claim 2, wherein the receiver in the aircraft cockpit comprises a cockpit printer.

7. The fuel information messaging system of claim 2, wherein the fuel management server communicates the selected transaction data to an airline computer system and wherein the airline computer system communicates the selected transaction data to the aircraft data communications system.

8. The fuel information messaging system of claim 2, wherein the fuel management server is in communication with an airline computer system for retrieving flight schedule information and fuel planning information related to the fueling transaction; and wherein the fuel management server stores the flight schedule information and the fuel planning information in the transaction record.

9. The fuel information messaging system of claim 8, wherein the fuel planning information specifies an amount of fuel to be dispensed, a configuration of the aircraft's fuel tanks, and any other information required by the fueling agent to perform the fueling transaction.

10. The fuel information messaging system of claim 8, wherein the fuel management server periodically communicates with the airline computer system to retrieve any updated flight schedule information and any updated fuel planning information related to the fueling transaction; and wherein the fuel management server stores the updated flight schedule information, if any, and the updated fuel planning information, if any, in the transaction record.

11. The fuel information messaging system of claim 8, wherein the fueling agent client device communicates with the fuel management server during the fueling transaction to receive selected transaction data from the transaction record.

12. The fuel information messaging system of claim 11, wherein the fueling agent client device periodically communicates with the fuel management server to receive updates to the selected transaction data.

13. The fuel information messaging system of claim 1, wherein the fuel management server and the fueling agent client device communicate via a wireless communications link.

14. The fuel information messaging system of claim 1, wherein the transaction data generated by the fueling agent client device comprises final fuel load data indicating an amount of fuel dispensed during the fueling transaction.

15. The fuel information messaging system of claim 14, wherein the final fuel load data is determined based on fuel meter start/stop values and fuel tank gauge readings input to the fueling agent client device.

16. The fuel information messaging system of claim 15, wherein the fuel meter start/stop values are electronically transmitted to the fueling agent client device by a data collection unit connected to and configured for monitoring the fuel meter.

17. The fuel information messaging system of claim 15, wherein the fuel tank gauge readings are transmitted to the fuel management server via the data communications system; wherein the fuel management server transmits the fuel tank gauge readings to the fueling agent client device.

18. The fuel information messaging system of claim 1, wherein the selected transaction data is encoded into an electronic message compatible with the data communications system.

19. The fuel information messaging system of claim 1, wherein the selected transaction data is encoded into an electronic message by an adapter accessible to the fuel management server.

20. A method for communicating fuel information comprising:

receiving transaction data relating to a fueling transaction from a fueling agent client device and storing said transaction data in a transaction record;

wirelessly transmitting fueling information from a data capture unit that interfaces with a vehicle for dispensing fuel to the fueling agent client device;

retrieving selected transaction data from the transaction record and encoding it into an electronic message compatible with a data communications system; and transmitting the encoded message to the data communications system for transmission to a receiver.

21. The method of claim 20, wherein the data communications system comprises an aircraft data communications system; and wherein the receiver is located in the cockpit of an aircraft.

22. The method of claim 21, wherein the aircraft data communication system comprises a digital data link system for transmitting data to and from the aircraft via VHF radio.

23. The method of claim 21, wherein the aircraft data communication system comprises Aircraft Communication Addressing and Reporting System.

24. The method of claim 21, wherein the receiver in the aircraft cockpit comprises a cockpit computer.

25. The method of claim 21, wherein the receiver in the aircraft cockpit comprises a cockpit printer.

26. The method of claim 21, wherein the selected transaction data is transmitted to an airline computer system where it is encoded into the electronic message; and wherein the airline computer system communicates the electronic message to the aircraft data communications system.

27. The method of claim 21, further comprising the steps of: receiving from an airline computer system flight schedule information and fuel planning information related to the fueling transaction; and storing the flight schedule information and fuel planning information in the transaction record.

28. The method of claim 27, wherein the fuel planning information specifies an amount of fuel to be dispensed, a configuration of the aircraft's fuel tanks, and any other information required by the fueling agent to perform the fueling transaction.

29. The method of claim 27, further comprising the steps of: periodically communicating with the airline computer system to retrieve any updated flight schedule information and any updated fuel planning information related to the fueling transaction; and storing the updated flight schedule information, if any, and the updated fuel planning information, if any, in the transaction record.

30. The method of claim 27, further comprising the step of transmitting selected transaction data to the fueling agent client device from the transaction record.

31. The method of claim 30, further comprising the step of periodically transmitting updates to the selected transaction data to the fueling agent client device.

32. The method of claim 20, wherein the transaction data is received from a fueling agent client device via a wireless communications link.

33. The method of claim 20, wherein the transaction data received from the fueling agent client device comprises final fuel load data indicating an amount of fuel dispensed during the fueling transaction.

34. The method of claim 33, wherein the final fuel load data is determined based on fuel meter start/stop values and fuel tank gauge readings input to the fueling agent client device.

35. The method of claim 34, wherein the fuel meter start/stop values are electronically transmitted to the fueling agent client device by a data collection unit connected to and configured for monitoring the fuel meter.

36. The method of claim 34, wherein the fuel tank gauge readings are transmitted to a fuel management server via the data communications system; and wherein the fuel management server transmits the fuel tank gauge readings to the fueling agent client device.

37. A fuel information messaging system comprising:

a fuel management server in communication with an airline computer system for retrieving flight schedule information and fuel planning information related to a fueling transaction and for storing said flight schedule information and fuel planning information in a transaction record;

a fueling agent client device in communication with the fuel management server for receiving selected flight schedule information and fuel planning information from the transaction record;

a data capture unit that interfaces with a vehicle for dispensing fuel to wirelessly transmit fueling information to the fueling agent client device; and wherein the fueling agent client device is further operable for collecting and generating transaction data relating to the fueling transaction and for transmitting said transaction data to a receiver via a wireless communication link.

38. The fuel information messaging system of claim 37, wherein the receiver is located in an aircraft cockpit.

39. The fuel information messaging system of claim 37, wherein the fuel planning information specifies an amount of fuel to be dispensed, fuel tank configuration and any other information required by the fueling agent to perform the fueling transaction.

40. The fuel information messaging system of claim 37, wherein the fuel management server periodically communicates with the airline computer system to retrieve any updated flight schedule information and any updated fuel planning information related to the fueling transaction; and wherein the fuel management server stores the updated flight schedule information, if any, and the updated fuel planning information, if any, in the transaction record.

41. The fuel information messaging system of claim 37, wherein the fueling agent client device communicates with the fuel management server during the fueling transaction to receive selected transaction data from the transaction record.

42. The fuel information messaging system of claim 41, wherein the fueling agent client device periodically communicates with the fuel management server to receive updates to the selected transaction data.

43. The fuel information messaging system of claim 37, wherein the transaction data generated by the fueling agent client device comprises final fuel load data indicating an amount of fuel dispensed during the fueling transaction.

44. The fuel information messaging system of claim 43, wherein the final fuel load data is determined based on fuel meter start/stop values and fuel tank gauge readings input to the fueling agent client device.

45. The fuel information messaging system of claim 44, wherein the fuel meter start/stop values are electronically transmitted to the fueling agent client device by a data collection unit connected to and configured for monitoring the fuel meter.

* * * * *